(12) United States Patent
Lai

(10) Patent No.: US 8,787,745 B2
(45) Date of Patent: Jul. 22, 2014

(54) MULTI-DIRECTIONAL PAD FOR AN UNDERWATER CAMERA HOUSING

(71) Applicant: Nauticam International Limited, New Territories (HK)

(72) Inventor: Yuk Shing Lai, Fotan (HK)

(73) Assignee: Nauticam International Limited, New Territories (HK)

( * ) Notice: Subject to any disclaimer, the term of this patent is extended or adjusted under 35 U.S.C. 154(b) by 0 days.

(21) Appl. No.: 13/927,273

(22) Filed: Jun. 26, 2013

(65) Prior Publication Data

US 2013/0343736 A1 Dec. 26, 2013

Related U.S. Application Data

(60) Provisional application No. 61/664,441, filed on Jun. 26, 2012.

(51) Int. Cl.
*G03B 17/08* (2006.01)

(52) U.S. Cl.
USPC ........................................................ 396/27

(58) Field of Classification Search
CPC .............................. G03B 17/08; H04N 5/2252
USPC ................................... 396/25, 27, 29; 348/81
See application file for complete search history.

(56) References Cited

U.S. PATENT DOCUMENTS

| 7,679,674 B2 * | 3/2010 | Nishizawa ..................... 348/376 |
| 2005/0168567 A1 | 8/2005 | Boon |
| 2009/0032420 A1 | 2/2009 | Zenzai |
| 2011/0211820 A1 * | 9/2011 | Yim ................................ 396/27 |
| 2013/0343736 A1 * | 12/2013 | Lai .................................. 396/29 |

FOREIGN PATENT DOCUMENTS

| JP | 2002090870 | 3/2002 |
| JP | 2004317844 | 11/2004 |
| JP | 2006114431 | 4/2006 |
| JP | 2009157171 | 7/2009 |

OTHER PUBLICATIONS

International Search Report and Written Opinion for PCT/GB 2013/051674 dated Oct. 17, 2013.

* cited by examiner

*Primary Examiner* — W B Perkey
(74) *Attorney, Agent, or Firm* — Young & Thompson

(57) ABSTRACT

The invention comprises an underwater camera housing having a body and handles on the body. The body also carries a pad positioned on the body so that the pad is accessible for use by a user substantially without the user being required to remove a hand from the most adjacent handle. The pad is able to be pressed at any point of its periphery and links mounted on the body between the pad and, in use, a position adjacent the controls of a camera are such that by pressing the pad the camera controls can be operated. The links comprise a compound lever system which in use extend between the pad and the multi selector of the camera when positioned within the housing.

12 Claims, 13 Drawing Sheets

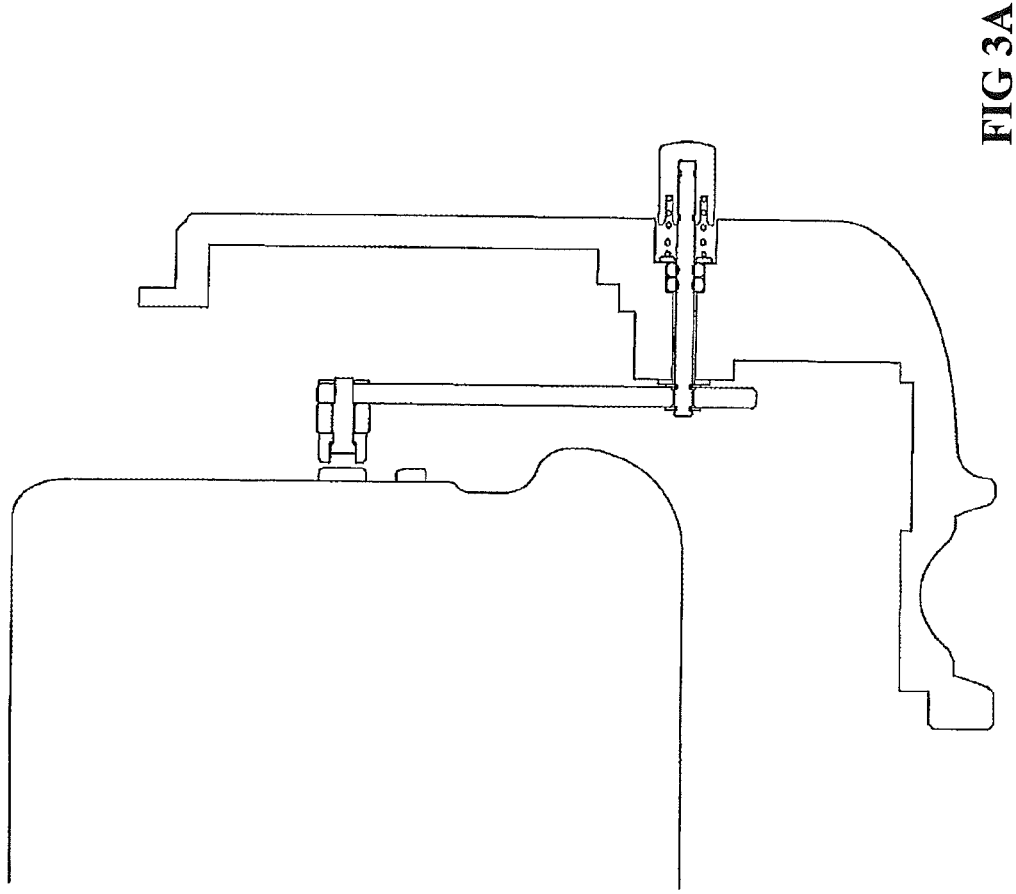

MULTI-DIRECTIONAL PAD FOR AN UNDERWATER CAMERA HOUSING

BACKGROUND OF THE INVENTION

1. Field of the Invention

This invention relates to a method of externally actuating the "multi selector" or "multi controller" of a camera housed inside a water-proof housing and more particularly to the design of the mechanism.

2. Description of Related Art

A multi selector of a digital camera is usually in the form of a circular pad or a group of buttons which acts as a navigational tool. The multi selector allows the user to navigate the camera menu, move focus points, browse zoomed-in images while in playback mode, and also allows other functions to be performed. The multi selector usually consists of five buttons for controlling up, down, left, right directions and a button in the centre of the button arrangement, usually labeled "OK" or "SET" for confirming a selection. Some cameras may also provide diagonal movements for enhanced navigation. The multi selector is usually ergonomically located where users can reach it with their right thumb while holding the camera.

In underwater photography, a water-proof housing is used to protect the camera from water ingress as well as to allow the user to access important functions of the camera from outside the housing. The external controls of the housing are normally in the form of push buttons and levers; the linkages between these controls and the camera are usually mechanical.

Housings for digital single lens reflex (DSLR) cameras are usually large in size and rather than the user holding the body of the housing itself, the housings are often designed to be used with handles. In underwater photography, the environment changes rapidly and subjects frequently, if not usually, move very fast. Some underwater photographers prefer to change the camera settings without removing his/her eye from the viewfinder so that the users primary attention remains focused on the fast changing underwater environment. An ideal housing would have controls ergonomically located where the user can reach them without removing their hands from handles.

FIG. 1 shows a conventional method to access the multi selector from outside of the underwater camera housing. The housing has direct push buttons aligned essentially vertically in use on the housing. O-rings are provided to prevent water ingress into the housing. E-clips are provided as an aid for the positioning of the mechanism in the housing while plastic caps on the ends of the shafts are the contact points to the camera. Springs are configured so that the push buttons always return to the original position after being pressed, and when subjected under external pressure to the extent specified by the housing's depth rating.

However because of the large size of the housing the group of push buttons on the housing may not be easily reached by users without removing the hand from the handle if direct push buttons are used for accessing the multi selector which is positioned on the rear face of the housing. Also, as the group of push buttons are positioned closely packed together, it is possible that while pressing one of the buttons, others are accidentally pressed; this is especially true when pressing the centre button of the multi selector. This difficulty is increased when the user is wearing gloves.

FIG. 2 shows a modified method to address the above problem. In this construction the push buttons are re-located nearer to the edge of the housing and hence closer to the thumb. The construction uses a rigid linkage, such as flat metal bars to transfer the movement of the push buttons to the required position. FIG. 3 shows how, in this configuration, the push button is connected near to one end of the metal bar and at the end there is rod which acts as a guide for the bar; at the other end of the bar, a plastic cap is attached, which engages with the multi selector of the camera.

The principal limitation of this single metal bar connection is that due to the existence of clearance in the guiding system of the rod, the resultant vertical movement of the plastic cap, which activates the camera's button, is often less than the amount of travel of the push button. This is demonstrated in FIG. 3A and FIG. 3B which show the effect of clearance as the push button is pushed in. Furthermore, this configuration is limited to the basic four directions only, i.e. up, down, left and right but lacks control in diagonal movements.

OBJECT OF THE INVENTION

It is an object of the invention to provide an operating mechanism in or on an underwater camera housing for an underwater camera housing that ameliorates some of the disadvantages and limitations of the known art or which will at least provide the public with a useful choice.

It is a further object of the invention to provide an operating mechanism in or on an underwater camera housing which allows access to substantially the full function of the multi selector of an underwater camera from outside the underwater housing in which the camera is used.

It is a still further object of the invention to provide a construction which allows access to substantially the full function of the multi selector of an underwater camera from outside an underwater housing in which the camera is housed in use including diagonal movements.

SUMMARY OF THE INVENTION

Accordingly in one aspect the invention consist in an underwater camera housing having a body, handles mounted on the body, a pad positioned on the body so that the pad is accessible for use by a user, the pad being able to be pressed by a user at any point of its periphery, links mounted on the body between the pad and, in use, a position adjacent or in contact with the multi selector controls of a camera so that by pressing the pad a selected camera control can be operated, characterized in that each link includes a first lever mounted on the body positioned to receive an input force from the pad, and a second lever mounted on the body positioned to receive an input force from the first lever and to provide a force on the selected camera control in use.

Preferably the second lever has an output point and the first and second levers are mounted such that the distance the output point of the second lever moves is greater than the movement of the pad.

This can ensure the resultant vertical travel of the caps is sufficient for reaching the cameras multi selector even when there is clearance in the guiding system of the shafts.

Preferably the links are positioned such that the camera controls can be activated by pressing the pad on any of up to eight points.

Preferably the pad is circular.

Preferably the pad has an external part and an internal part relative to the body, the external part of the pad has two pins that pass through its diameter and are free to rotate along the axis of the pins giving a first axis of rotation, the internal part having a further part mounting the pad through another two pins, giving a second axis of rotation, the two axes of rotation being perpendicular to each other so that in use the pad forms a universal joint.

Preferably four shafts are provided which pass through the wall of the body and are placed with one end adjacent the pad at the up, down, left, right points and are activated when the pad is pressed.

Preferably the second lever carries caps at the distal end thereof which caps engage the multi selector of a camera within the housing in use.

Preferably the caps are formed of a plastics material.

Preferably the travel of the pad to a selected point on the first lever; the selected point on the first lever being the position of the input to the second lever.

Preferably the second lever is a lever of the third class to magnify the output vertical movement of the cap.

Preferably the contact point between the first lever and the second lever can be adjusted, so that it is possible to incorporate the present invention in other situations where the amount of vertical travel required is different.

Preferably a compound lever system is provided between the shaft and the caps.

In a compound lever, the output from one lever becomes the input for the next lever in the system.

Preferably the first (upper) lever of the present invention transfers the travel of the circular pad to a defined point on the bar; this becomes the input of the second lever.

Since it is desirable to place the circular pad as close to the housings edge as possible, a single lever configuration is not desirable as it would require the fulcrum to be placed rather far away from the shafts to achieve the magnification of travel.

In a further aspect the invention consists in a housing according to the preceding paragraphs, the housing having a camera mounted therein, the camera having a multi selector characterized in that the ends of the second levers are positioned adjacent or in contact with the multi-selector of the camera.

BRIEF DESCRIPTION OF THE DRAWINGS

The invention will now be described, by way of example only, by reference to the accompanying drawings:

FIG. 3A is the cross-section view of the mechanism of relocating push buttons (un-pressed) in the construction of FIG. 3.

DETAILED DESCRIPTION OF THE INVENTION

The following description will describe the invention in relation to preferred embodiments of the invention, namely an operating mechanism and/or an underwater camera housing. The invention is in no way limited to these preferred embodiments as they are purely to exemplify the invention only and that possible variations and modifications would be readily apparent without departing from the scope of the invention.

Figure 1:
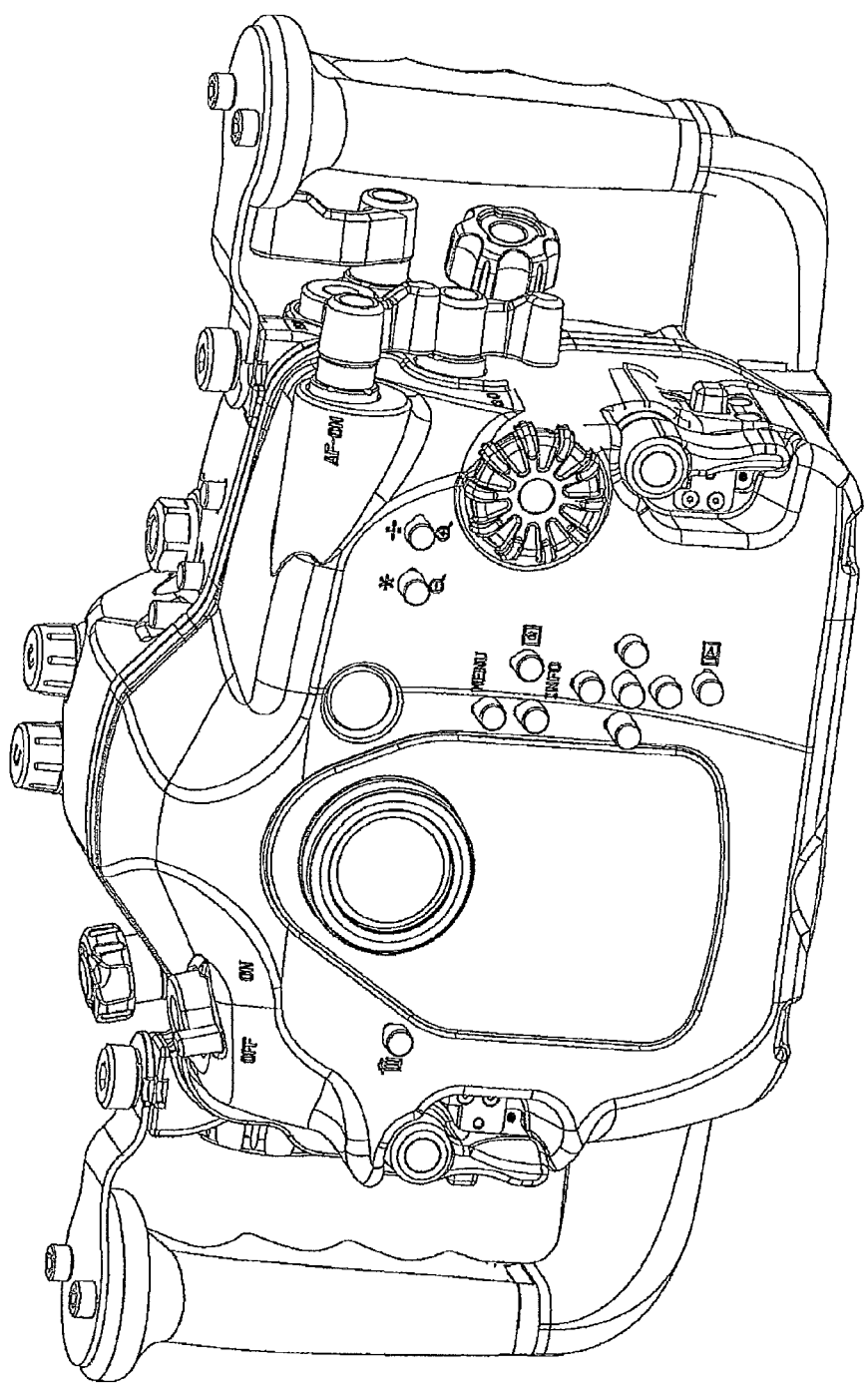
FIG. 1 is an illustration of a conventional method of controlling the multi selector of a camera housed in an underwater housing.
Figure 2:
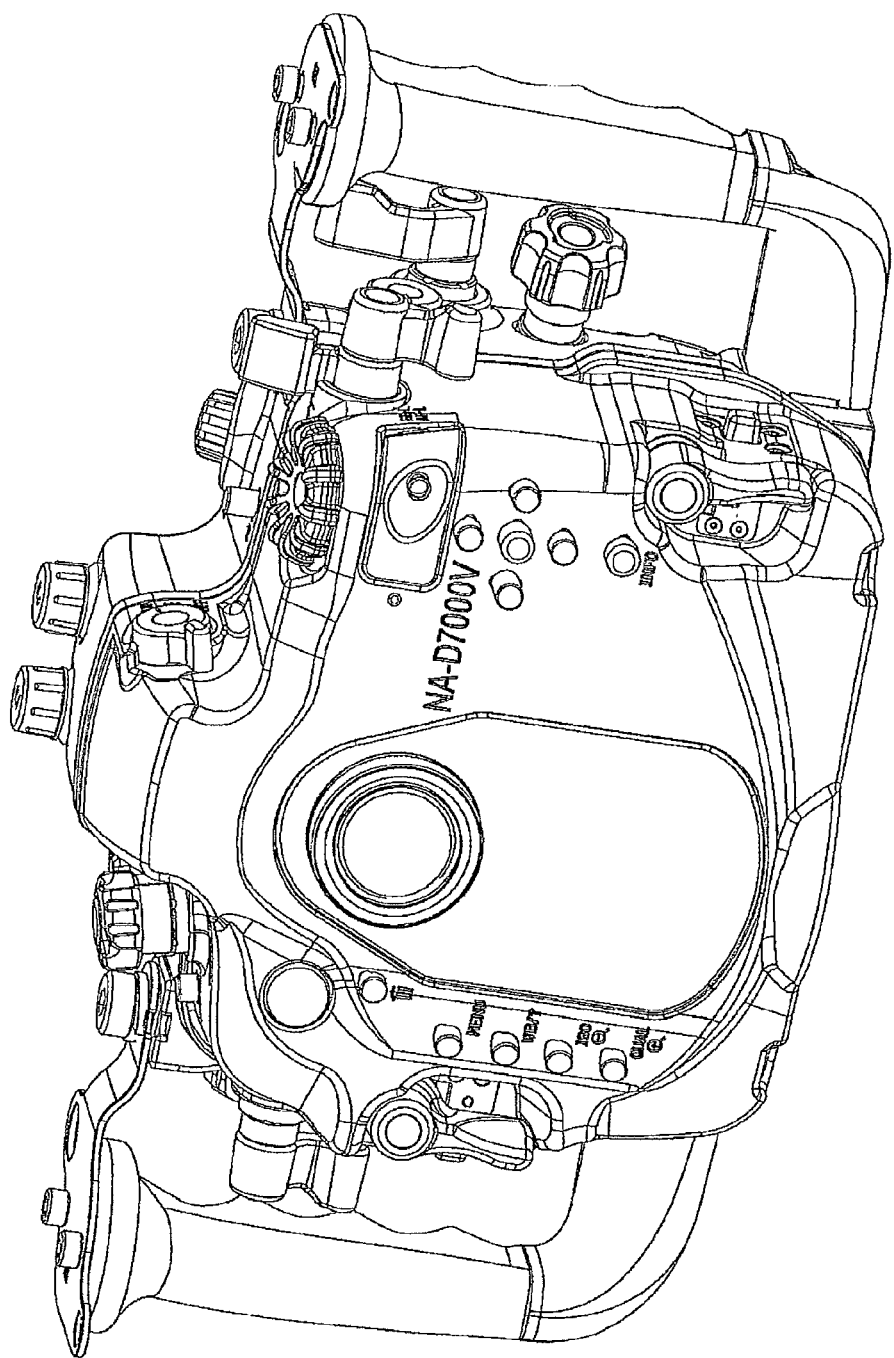
FIG. 2 is an illustration of another conventional method of controlling the multi selector of a camera housed in an underwater housing by relocating push buttons.
Figure 3:
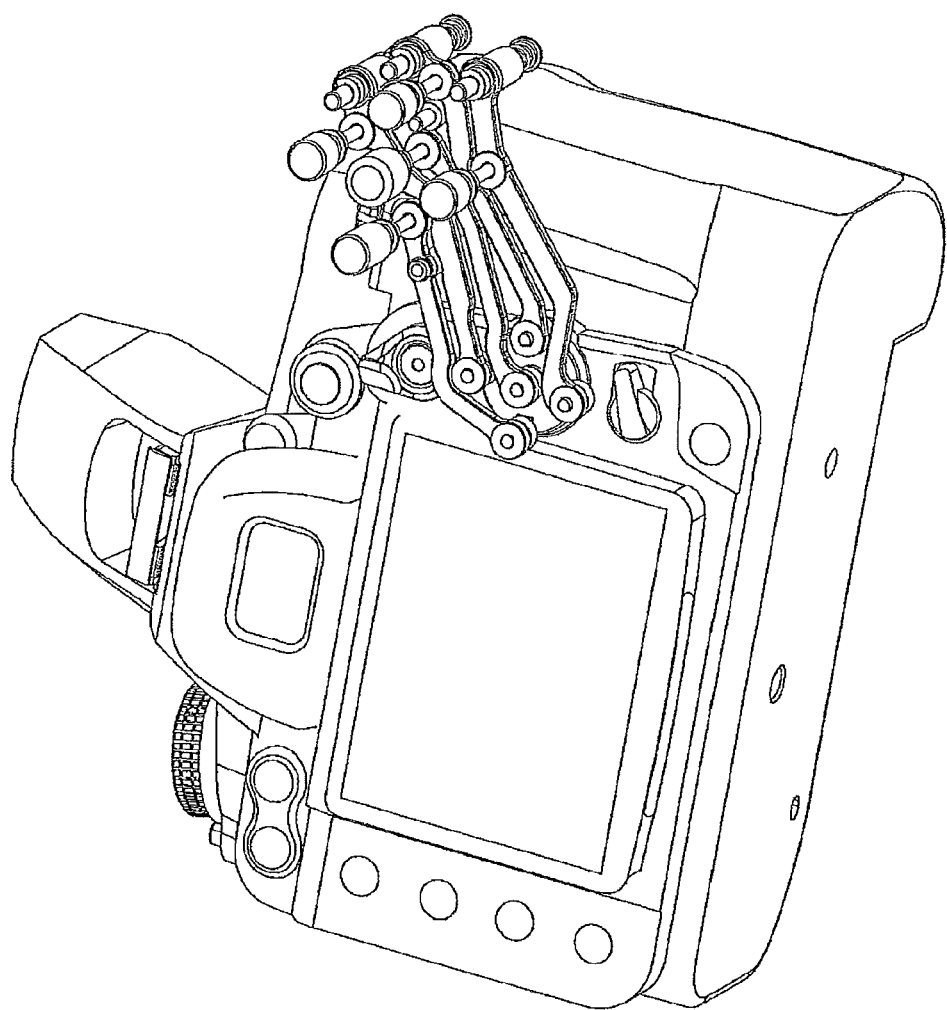
FIG. 3 is a detailed view showing the mechanism of relocating push buttons in an existing underwater camera housing.
Figure 3B:
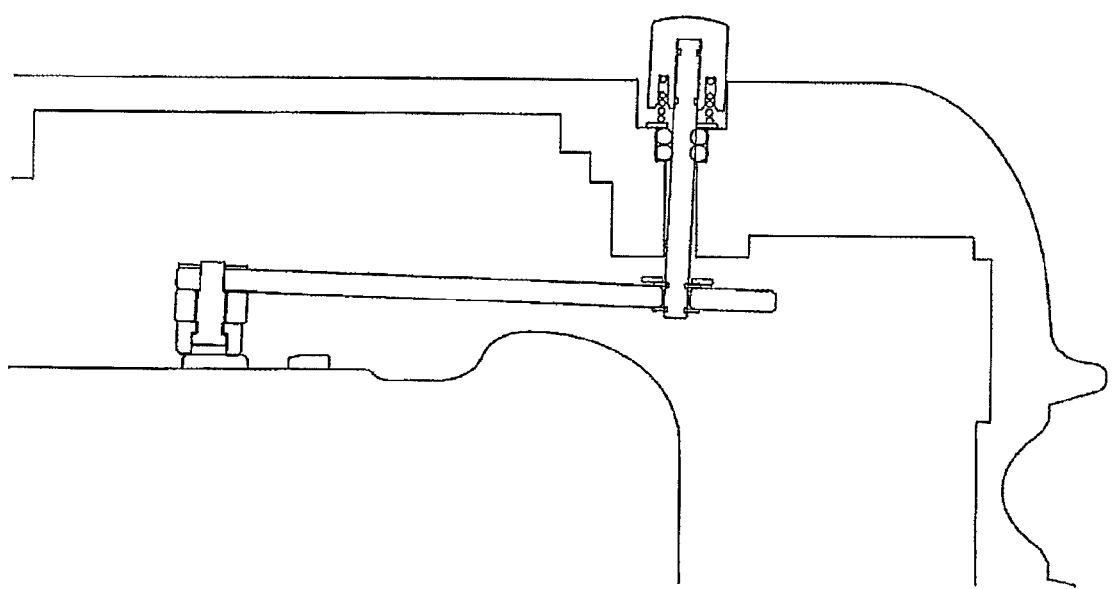
FIG. 3B is the cross-section view of the mechanism of relocating push buttons as shown in FIG. 3 (pressed)
Figure 4:
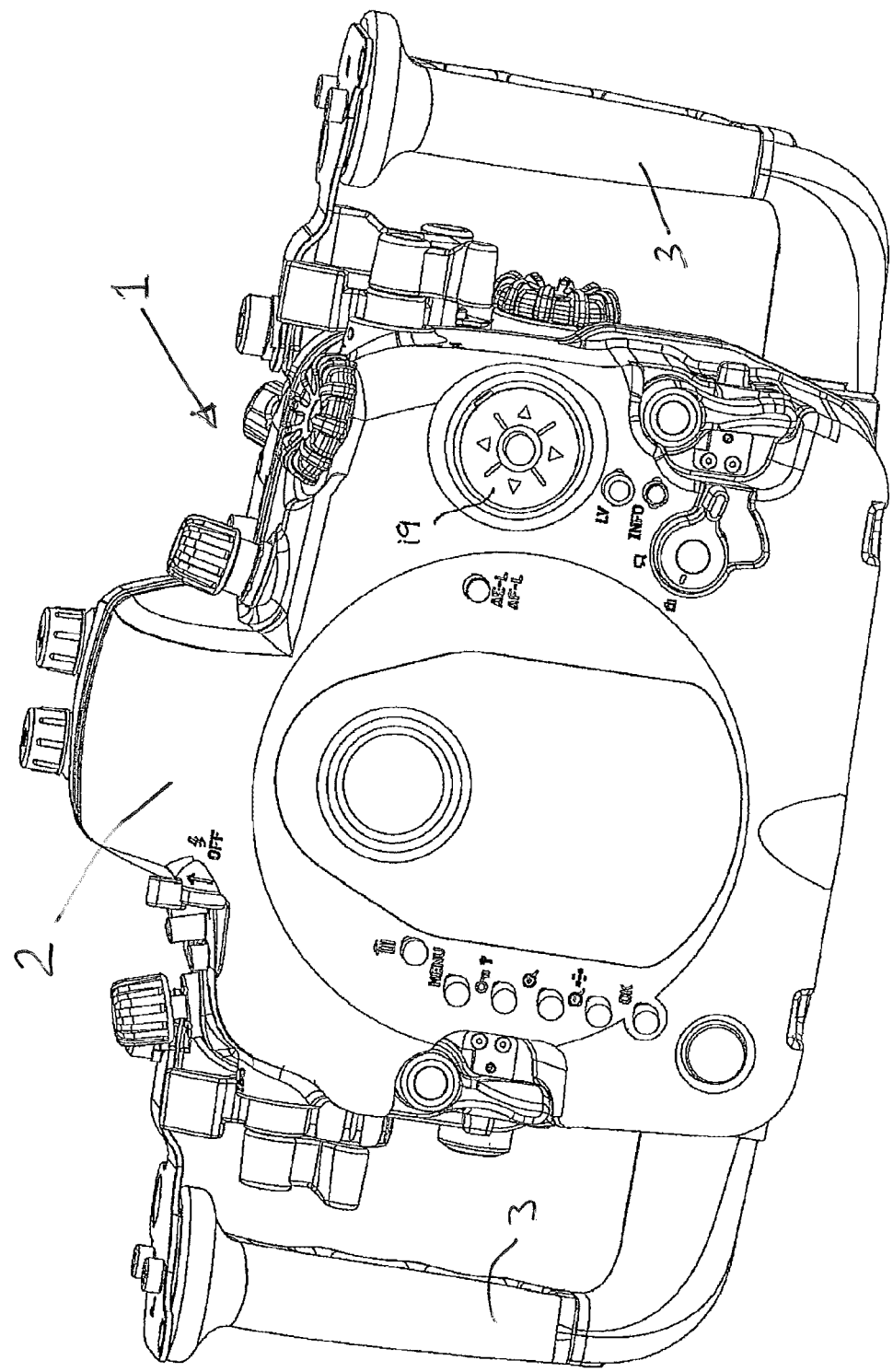
FIG. 4 is an illustration of the presented invention used to control the multi selector of a camera housed in an underwater housing.

FIG. 4 shows an illustration of the presented invention. An underwater camera housing 1, which in use is able to receive a camera, is provided. The housing 1 has a body 2 which carries handles 3, usually one each side of the body 2 as seen in FIG. 4. A pad, preferably a circular pad 19 is provided which is accessible from the exterior of the housing and is able to be used by a user of the housing 1. The camera is not shown but the interior of the housing 1 carries mounting devices such as those typical of underwater camera housings to mount the camera. Typically the outer side of the handles 3 are 70 to 75 mm from the edge of the body 2. Thus if the circular pad 19 is placed near to the edge of the body 2 the circular pad 19 can be easily reached by a user of the housing 1.

Figure 5:
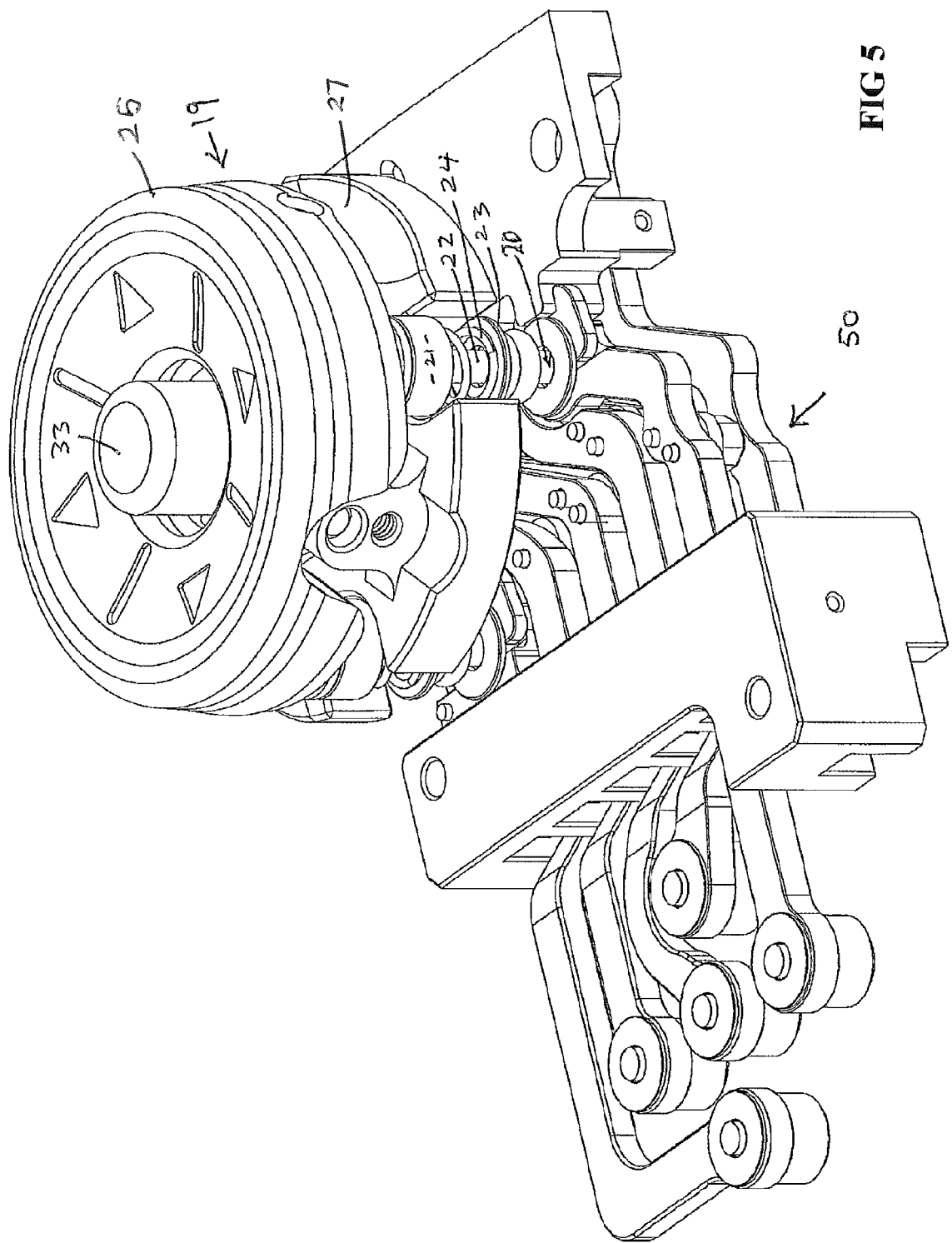
FIG. 5 is an isometric view of the circular pad and the compound lever system used in the invention of FIG. 4.

Links are provided between the pad 19 and a position within the housing 1 where in use the distal ends of the links will be adjacent the multi-selector of a camera positioned within the housing. The links are shown in FIG. 5 which is an isometric view of the circular pad 19 and a compound lever system 50. Four shafts 20 are placed below the pad 19. The four shafts 20 pass through the wall of the housing and are activated when the circular pad 19 is pressed. By pressing one of the basic four directions of the pad 19, i.e. up, down, left and right, the respective shaft 20 and hence the set of compound levers (described hereinafter) are activated; by pressing the four diagonals of the pad, two adjacent shafts and compound levers are activated. The shaft 20 comprises a head 21, a rod 22 extending outwardly from the head 21, a stop 23 movably mounted on the rod 22 and a spring 24 between the stop 23 and the head 21.

Figure 6:
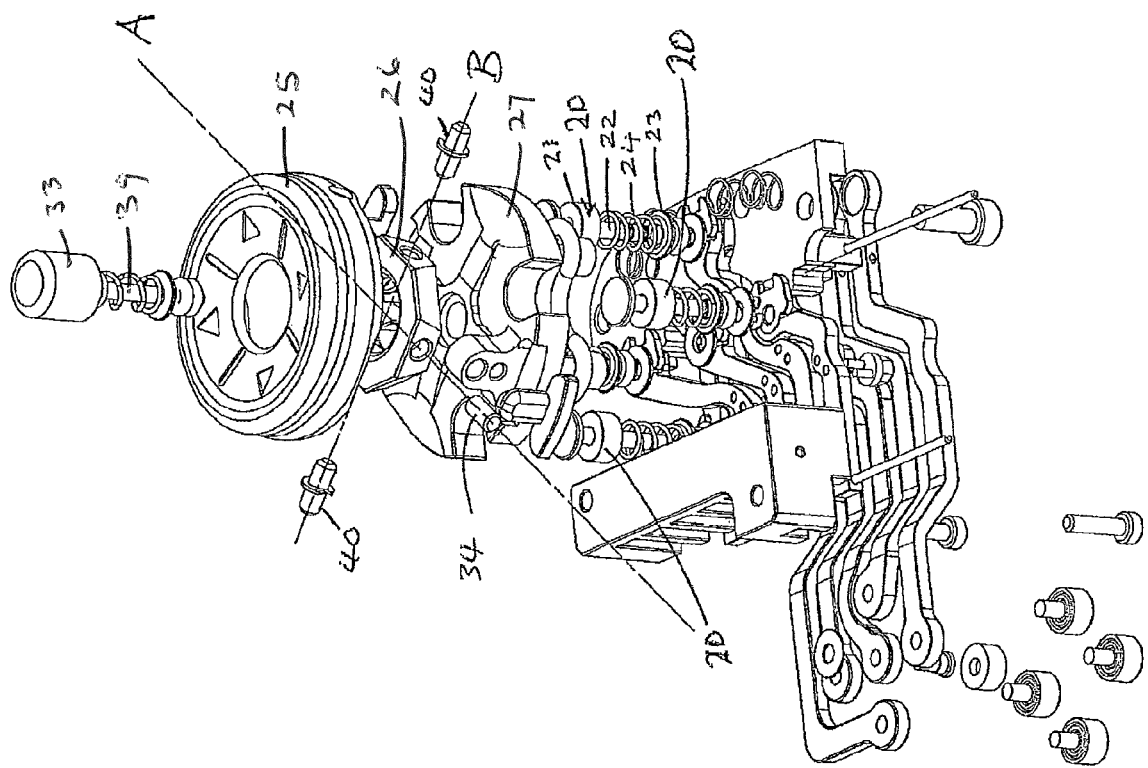
FIG. 6 is an exploded isometric view of the circular pad and the compound lever system according to the invention as shown in FIG. 4.

FIG. 6 is an exploded view of the construction shown in FIG. 5. Thus the present invention can be divided into two parts, the circular pad 19 for providing diagonal controls and the compound lever system 50 for relocation and to magnify the output vertical distance.

Figure 7:
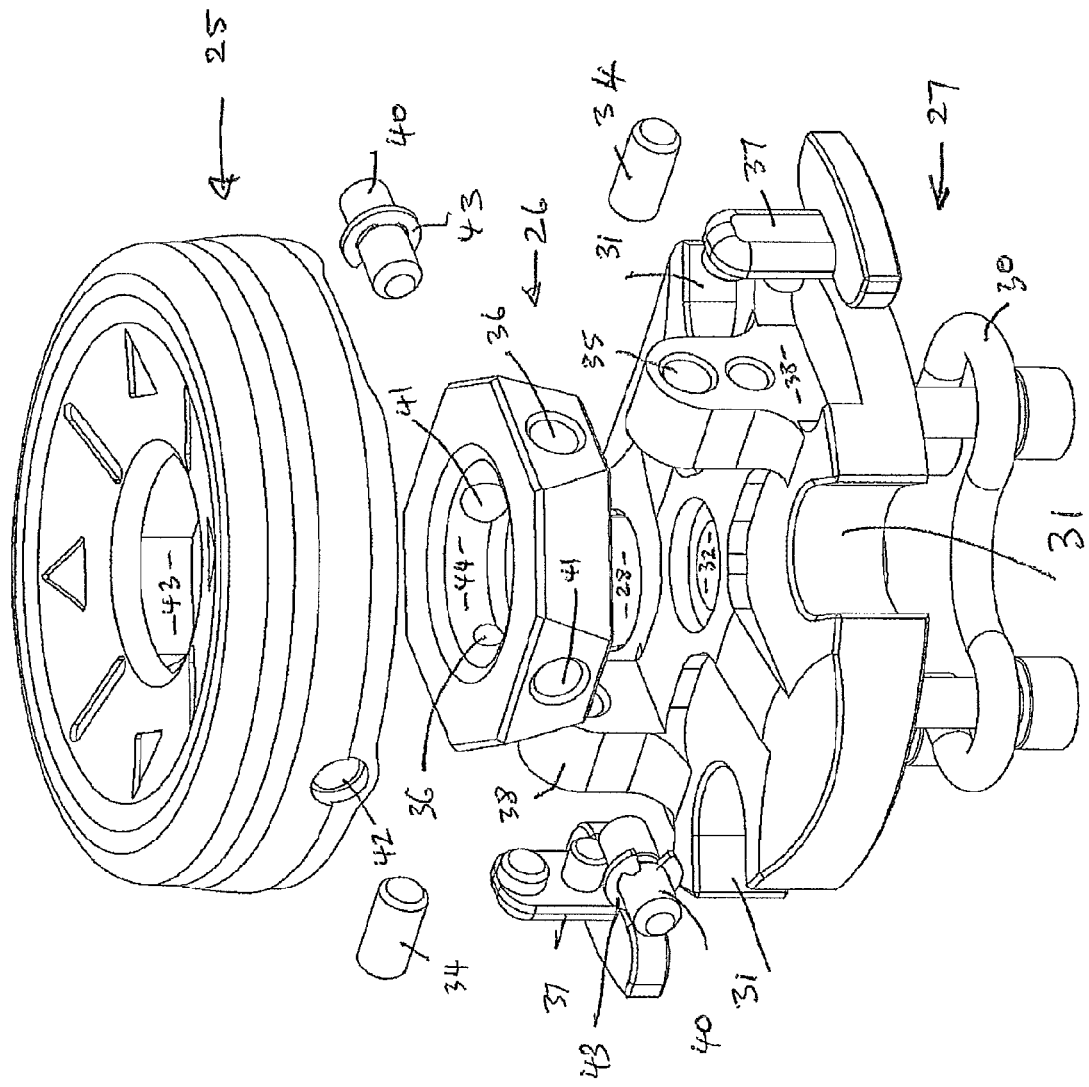
FIG. 7 is an exploded view of the circular pad used in the embodiment of the invention shown in FIG. 4.

An exploded view of the circular pad is shown in FIG. 7. The circular pad 19 consists of three main parts. Firstly an outer pad 25, secondly a connector ring 26 and thirdly a base 27. The base 27 is fastened to the housing by four screws 28 shown in FIG. 8.

A groove 29 is provided in the underside of the base 27 (see FIG. 8) where an O-ring 30 is placed to prevent water ingress. There are four slots or cut outs 31 in the base 27 into which the four shafts 20 which activate the camera's up, down, left and right controls are positioned. A hole 32 is provided in the centre of the base 27 into which a further shaft 39 extending downwardly the push button 33 (FIG. 5) which controls the "OK" function is positioned. Shaft 39 is spring loaded in the same manner as shaft 22.

The base 27 is connected to the connector ring 26 by two pins 34 (see FIG. 8) which pass through holes 35 in the base 27 and 36 in the connector ring 26. The exit diameter of hole 36 is smaller than the diameter of the pin 34 and with a cover 37 on the other side of an upstand 38 carrying the holes 35, the pins 34 re held in position. The upstands 38 extend outwardly from the base 27 towards the outer pads 25 and the connector ring 26 is dimensioned to be positioned between the upstands 38. The pins 34 provide an axis (A) allowing the connecting ring (2) to rotate along the axis (A). Thus a universal joint is constructed.

The connector ring 26 is connected to the outer pad by another two pins 40 passing through holes 41 and 42 in the connector ring 26. C-clips 43 are installed on pins 40 to hold the pins 40, the outer pad 25 and connector ring 26 in position. As can be seen from FIG. 7 the C-clips 43 are substantially centrally located on the pins 40. This results in an axis (B) which is perpendicular to axis (A), and the outer pad 25 can rotate along the axis (B).

Therefore, the outer pad 25 can rotate along on axis (A) and axis (B). Since the two axes (A), (B) are independent of each other, this results in movement in all directions. The hole 43 in the centre of the outer pad 25 and the hole 44 in the connector ring 26 again allow the push button controlling the "OK" function of the camera to pass through the outer pad 25 and the connector ring 26.

Figure 8:
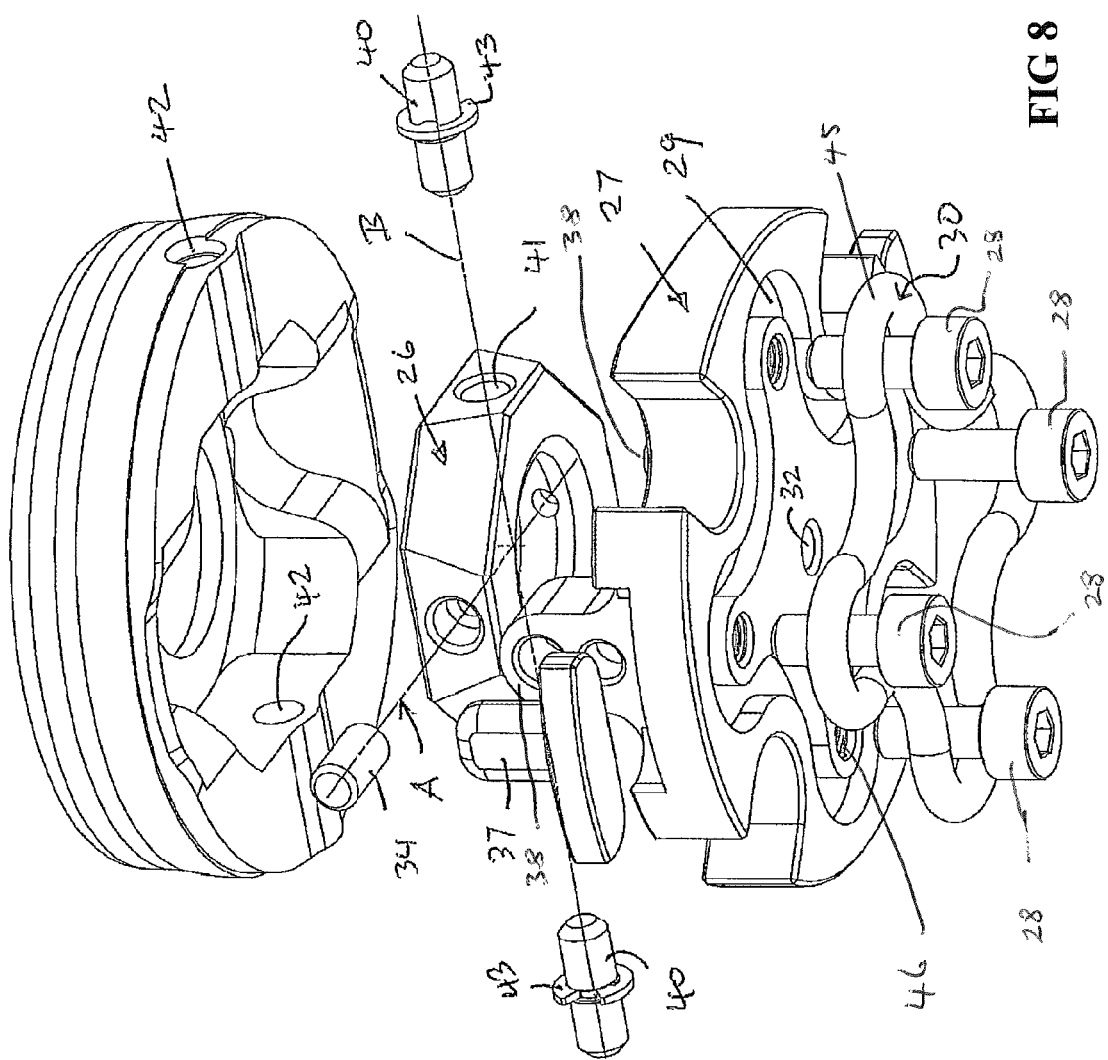
FIG. 8 is a bottom exploded view of the circular pad as shown in FIG. 7.

FIG. 8 is a bottom exploded view of the circular pad from below which shows the "O" ring 32 which has lobes 45 through which the screws 28 pass into threaded apertures 46 in the base 27. The groove 29 which receives the "O" ring 30 can also be seen.

Figure 9:
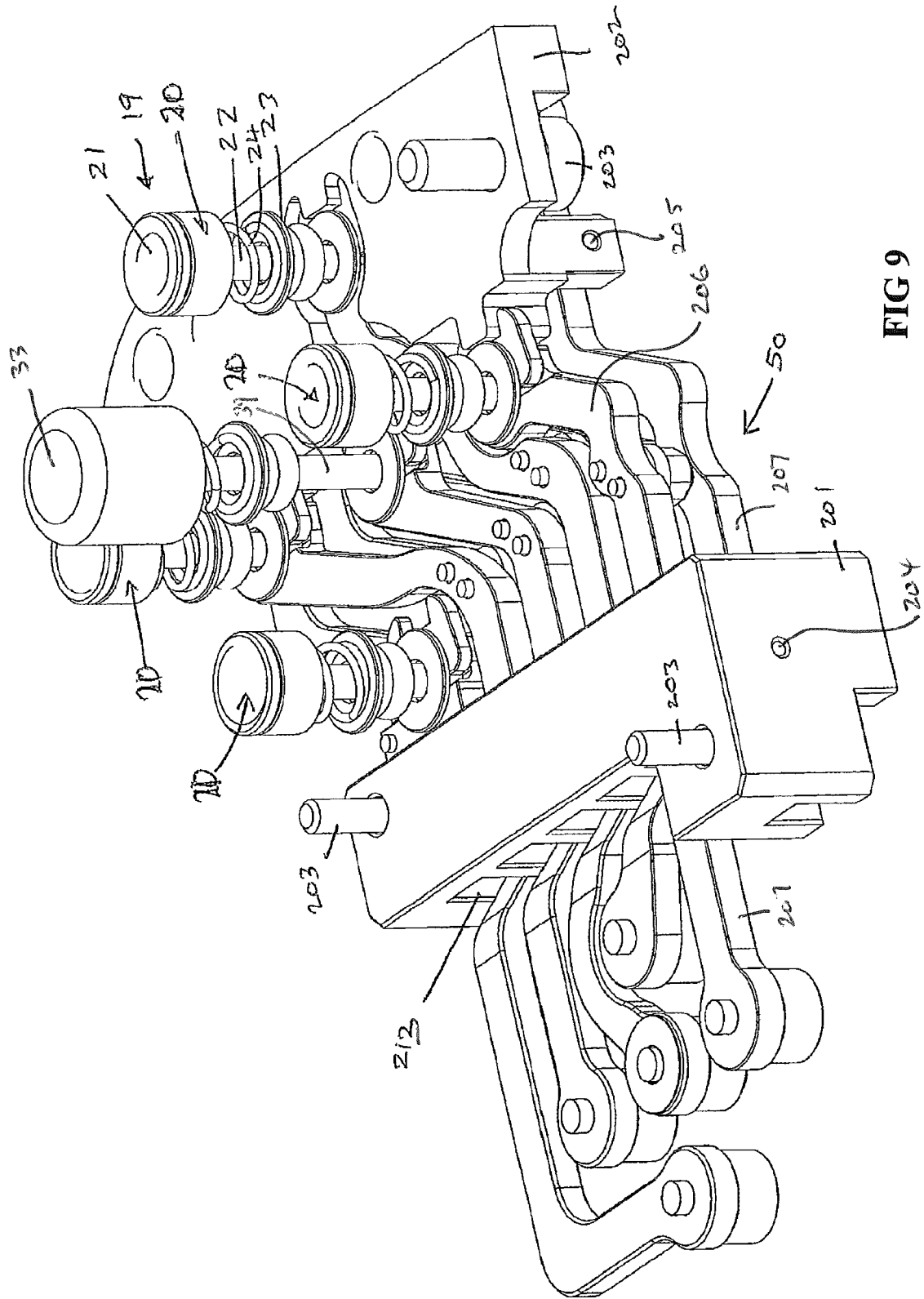
FIG. 9 is an isometric view of the compound lever system of the preferred form of the invention.

FIG. 9 is an isometric view of the compound lever system 50. The compound lever system is attached inside the housing by blocks 201, 202 and by screws 203 which pass through the blocks 201 and 202 into threaded receiving apertures in the housing. The slots 212 on the block 201 act as guides for the second or lower levers 207.

Figure 10:
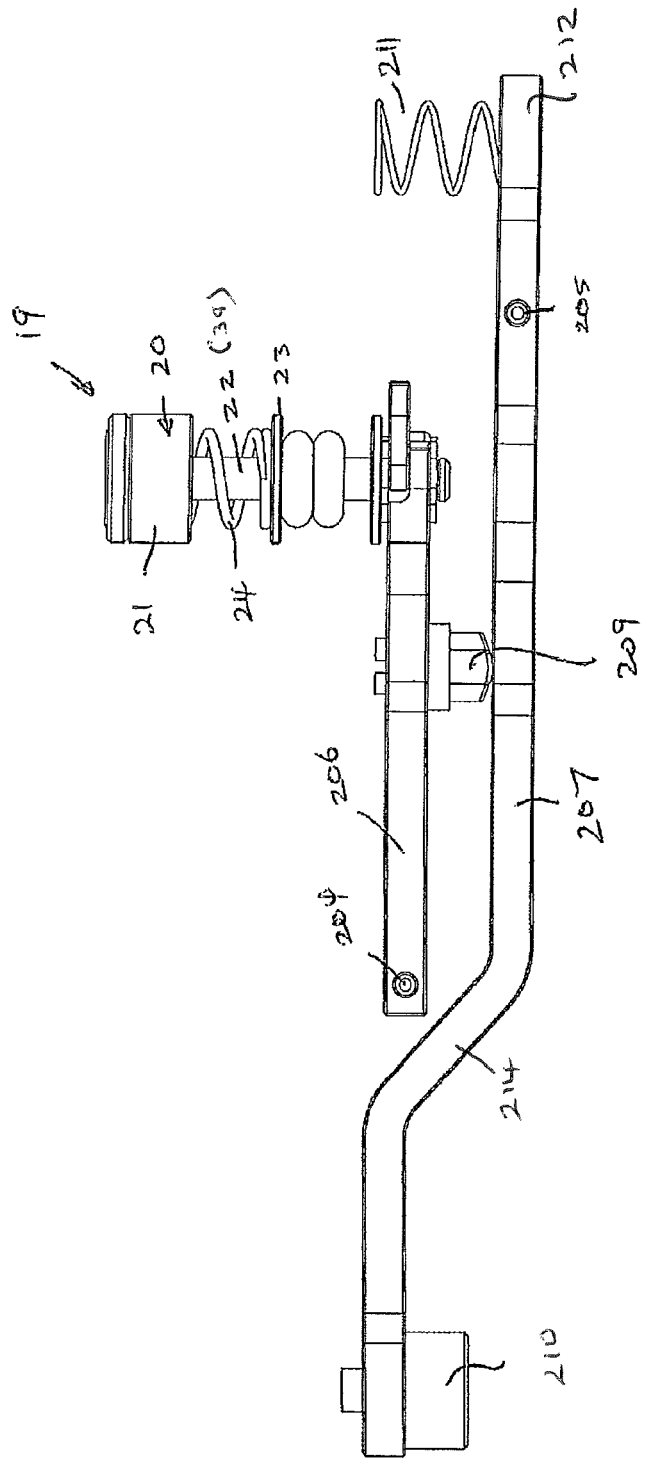
FIG. 10 is an exploded isometric view of the compound lever system of the preferred form of the invention.

FIG. 10 is a side view of one of the compound levers. Rod 204 and Rod 205 are the fulcrum of the first or upper levers 206 and lower levers 207 respectively. The rod 204 passes longitudinally through the block 201 which is hollowed on its interior to accommodate the rod 204 and parts of the operating mechanism. Rod 205 similarly passes longitudinally through the block 202 which is similarly hollowed in its interior. The rod 22, placed below the circular pad 19, is attached to or adjacent an end of the upper lever 206 and acts as the input point for forces applied to lever 206.

A block such as plastic block 209 is attached to the underside of the upper lever 206 and the block 209 acts as the output point to apply forces to lever 207. The tip of the plastic block 209 may be curved or somewhat "v" shaped and the tip is in contact with the lower lever 207 so that when the circular pad is pressed the plastic block 209 will act as an input point to the lower lever 207. This will move the output point of the second lever 207, which may be provided by a pad such as the plastic pad 210 at the end of the lower lever 207 to press on the camera multi selector.

Spring 211 is installed on the end 212 of the lower lever 207 to retain the lower lever 207 in the initial position when the shaft 22 is not being pressed. The spring 211 is positioned between the lever 207 and the underside of the block 202.

Return of the rod 22 to its original position is effected by spring 24.

The block 201 has five cut-outs 213 to allow the levers 207 to exit the block 201. the levers 207 are shaped towards lever 26 in the area 214 so as to provide space for the pad 10 to engage the multi selector of the camera.

Adjustment of the vertical distance travelled by the plastic cap 210 can be effected by relocating the position of the plastic blocks 209 along the upper levers 206.

Figure 11:
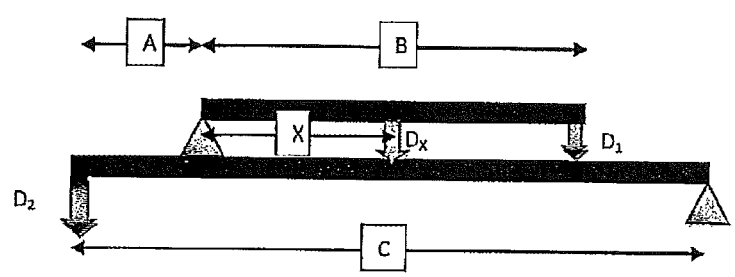
FIG. 11 is a diagram of a compound lever usable in the preferred form of the invention.

Referring to FIG. 11, which is a force diagram representing the compound lever system:
Considering the upper level 206, $$\frac{D1}{Dx} = \frac{B}{X}$$

and from the lower level 207 we get:

$$\frac{D2}{Dx} = \frac{C}{(C - A - X)}$$

by combining these:

$$X = \frac{D2 * B(C - A)}{D1 * C + D2 * B}$$

where X is the distance between the plastic block 209 and the fulcrum 204 of the upper lever,
D1 is the vertical distance travelled by the shaft,
Dx is the vertical distance travelled by the plastic block,
D2 is the vertical distance travelled by the plastic cap,
A is the horizontal distance between the fulcrum of the upper lever and the plastic cap,
B is the length of the upper lever,
C is the length of the lower lever.

Therefore, the position of the plastic block 209, i.e. the contact point of the two levers 206 and 207, can be determined by the above equation.

In use, when assembled and with a camera inside the housing, pressing the periphery of the pad 19 will cause the appropriate buttons of the DSLR camera to be pressed by transfer of the movements by rods 22 or 39.

When the user presses on, for example, the upper-right corner of the circular pad 19, the upper and the right shafts 22 are pressed down simultaneously. This results by use of the invention in both the upper and right edge of the multi selector of the camera being pressed. With many cameras this action (pressing both the upper and right edge of the multi selector) is equivalent to pressing on its upper-right edge with activates the diagonal movement of e.g.

1) focus point location when setting the focus point; or
2) moving the displayed picture around diagonally when it is zoomed in during playback mode.

This works well on new housings using the present invention.

ADVANTAGES

By providing a moveable pad to operate the Camera buttons and locating this pad near the handles of the housing locating the camera buttons may be operated without the necessity of the typical user having to remove his or her hands from the housing handles. This increases the ability of the user to follow the often rapidly changing environment by using both handles while allowing adjustments of the camera to be made.

The compound lever system increases the precision and stability of the control system and also allows an increase in the range of functions controllable from the exterior of the housing.

I claim:

1. An underwater camera housing having a body, handles mounted on the body, a pad positioned on the body so that the pad is accessible for use by a user, the pad being able to be pressed by a user at any point of its periphery, links mounted on the body between the pad and, in use, a position adjacent or in contact with the multi selector controls of a camera so that by pressing the pad a selected camera control can be operated, characterized in that each link includes a first lever mounted on the body positioned to receive an input force from the pad, and a second lever mounted on the body positioned to receive an input force from the first lever and to provide a force on the selected camera control in use.

2. An underwater camera housing as claimed in claim 1 characterized in that the second lever has an output point and the first Lever and second lever are mounted such that the distance the output point of the second lever moves is greater than the movement of the pad.

3. An underwater camera housing as claimed in claim 1 characterized in that the links are positioned such that the camera controls can be activated by pressing the pad on any of up to eight points.

4. An underwater camera housing as claimed in claim 1 characterized in that the pad is circular.

5. An underwater camera housing as claimed in claim 1 characterized in that the pad has an external part and an internal part relative to the body, the external part of the pad has two pins that pass through its diameter and are free to rotate along the axis of the pins giving a first axis of rotation, the internal part having a further part mounting the pad through another two pins, giving a second axis of rotation, the two axes of rotation being perpendicular to each other so that in use the pad forms a universal joint.

6. An underwater camera housing as claimed in claim 1 characterized in that four shafts are provided which pass through the wall of the body and are placed with one end adjacent the pad at the up, down, left, right points and are activated when the pad is pressed.

7. An underwater camera housing as claimed in claim 1 characterized in that the second lever carries caps at the distal end thereof which caps engage the multi selector of a camera within the housing in use.

8. An underwater camera system as claimed in claim 7 characterized in that the caps are formed of a plastics material.

9. An underwater camera housing as claimed in claim 1 characterized in that the first lever transfers the travel of the pad to a selected point on the first lever; the selected point on the first lever being the position of the input to the second lever.

10. An underwater camera housing as claimed in claim 1 characterized in that the second lever is a lever of the third class to magnify the output vertical movement of the cap.

11. An underwater camera housing as claimed in claim 10 characterized in that the contact point between the first lever and the second lever can be adjusted.

12. An underwater camera housing as claimed in claim 1 having mounted therein a camera having a multi selector characterized in that the ends of the second levers are positioned adjacent or in contact with the multi-selector of the camera.

* * * * *